Dec. 2, 1958     T. S. GORTON, JR     2,862,823
FROZEN FOOD PACKAGE
Filed March 14, 1956
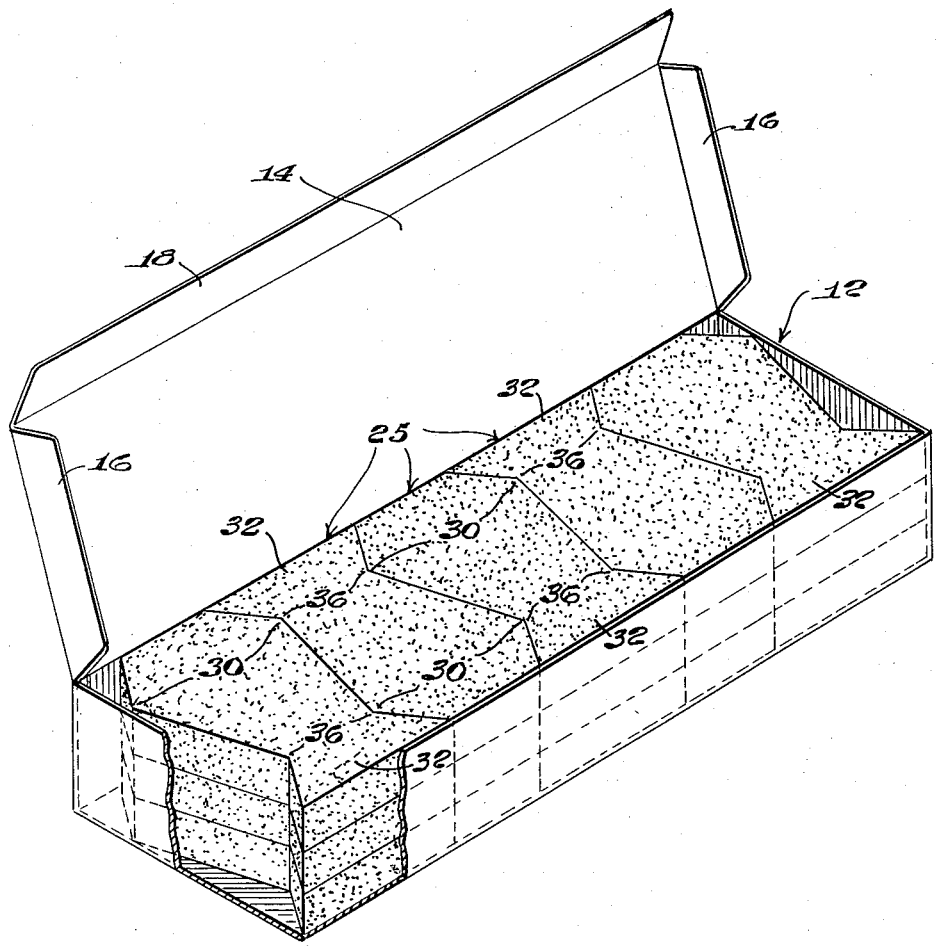
INVENTOR.
Thomas S. Gorton, Jr
BY
J. Stanley Churchill
ATTORNEY United States Patent Office 2,862,823
Patented Dec. 2, 1958

2,862,823

FROZEN FOOD PACKAGE

Thomas S. Gorton, Jr., Cambridge, Mass.

Application March 14, 1956, Serial No. 571,526

2 Claims. (Cl. 99—195)

This invention relates to a frozen food package.

In general the invention has for an object to provide a novel frozen food package comprising a flexible carton, preferably elongated, and a plurality of substantially identically shaped portions of frozen food packaged in contiguous relation and substantially filling the interior of the carton. The individual portions of the frozen food are shaped to form identical units which are interlocked contacting adjacent faces thereof to reduce to a minimum and substantially prevent any relative movement between the individual frozen food portions by reason of the flexing of the carton during the rough handling to which such packages are usually subjected during shipment.

The present invention finds particular utility in connection with the production of a frozen food package containing breaded fish products, such as breaded fillets in either their cooked or uncooked condition. Heretofore substantial difficulty has been experienced in the packaging of fish products of this type because of the tendency of an elongated carton to flex transversely during shipment causing relative movement between the individual fish fillets resulting in abrasion of the marginal portions of the fish fillets as well as the rubbing off of substantial quantities of the bread crumbs. Oftentimes when the package was opened a large amount of finely divided fish and bread crumbs was found to have accumulated within the carton, and this not only resulted in waste but detracted from the appearance of the package from the consumers' view point and also detracted from the usability and commercial value of the fish fillets.

With the foregoing general object in view and such others as may hereinafter appear the present invention consists in the novel frozen food package and in the method of making the same hereinafter described and particularly defined in the claims at the end of this specification.

The drawing illustrates in perspective, with portions broken away, a frozen fish package of breaded fish fillets embodying the invention.

Referring now to the drawing, the present novel frozen food package comprises an elongated carton 12 of any usual or preferred form and which preferably comprises a flexible carton of a waterproof nature and of the general type now used in the packaging of frozen fish fillets. The carton 12 may be of any usual construction herein shown as provided with a hinged cover 14 having the usual end flaps 16 and front tucking flap 18, the flaps being adapted to be projected down into the carton between the fish fillets and the carton walls when the cover is in its closed position.

In accordance with the present invention the individual frozen food elements, and which for simplicity of description will be hereinafter referred to as "fish fillets," are preshaped to form substantially identical units 25. Each unit has its opposite side walls shaped to form at least one and preferably two projections 30, 32 and at least one recessed portion so related to one another as to enable adjacent units to be packaged in alternate directions extending transversely of the carton and with the projections at the side of one unit nesting within the recesses 36 of the opposite side of the next adjacent unit.

In the embodiment of the invention illustrated in the drawing, the individual fillets 25 are shaped to provide a projecting portion 30 at each side of the fillet at a point adjacent but spaced a short distance from one end of the fillet and with a flaring or projecting tail portion 32 at the second end of the fillet. Intermediate the ends of the fillet, each side thereof is provided with a complementary recessed portion 36 which is spaced from the tail end of the fillet a distance substantially equal to the distance of the projection 30 from the first or head end of the fillet so that when the fillets are packed in the carton with the head ends extending in alternately opposite directions transversely of the carton the adjacent sides nest in closely packed relation, and the projecting portions 30, 32 of one fillet cooperate with the recessed portions of the adjacent fillets to interlock and effectively prevent any relative movement of the packaged fillets within the carton in a direction lengthwise of the fillets or transversely of the cartons. The size of the individual fillets with relation to the length of the carton is preferably such that the projecting portions 30, 32 and recesses 36 of the endmost fillets are in close contact with the ends of the carton, thus preventing any movement in a direction longitudinally of the carton. The described package enables an economical, lightweight carton to be employed while safeguarding the fillets from damage when the carton is subjected to transverse flexing incident to the blows to which it is usually subjected during handling in shipment, inadvertent dropping of the package or otherwise, and also minimizing damage when the carton is subjected to blows at its ends.

The projections 30, 32 and recesses 36 formed upon the sides of the individual fillets making up the package may take any one of a large number of forms, either angular or curved in nature, and of any desired number so long as the adjacent fillets may be interlocked to keep them from relative movement transversely of the carton. I have discovered that for most efficient operation the recesses formed in the sides of the individual fillets should be of a depth equal to about one-third of the total width of the fillet. Any further reduction in the remaining width of the fillet between such recesses renders the fillet too fragile to resist the stresses to which it is usually subjected in shipment. The width of the projections should amount to about one-tenth to one-third of the width of the fillet in order for the projection to accomplish the result of retaining the individual units in a substantially immovable position transversely of the carton during the shipment of the package.

In practice the individual fish fillets may be cut or died into the illustrated or described shapes and in some instances may be molded from flaked bodies of fish into the desired shapes. The invention contemplates a frozen package wherein the individual fish fillets may be packed in an unfrozen condition or in partial or completely cooked conditions, and the invention finds particular utility in those instances where the fish fillets are breaded in accordance with usual practice.

While the invention is primarily concerned with the production of a package of fish fillets, it will be understood that other food products may be packaged in the described manner.

While the preferred embodiment of the invention has been herein illustrated and described, the invention may be embodied in other forms within the scope of the following claims.

Having thus described the invention, what is claimed is:

1. A food package comprising a flexible carton and a plurality of individual food units of fish material preformed into predetermined identical shapes, said units having vertical sides and flat top and bottom surfaces and being closely packed within and substantially filling the interior of the carton, adjacent vertical sides of the units being provided with preformed complementary interlocking projections and recesses, said units being packaged with the projection of one unit interlocked with the recess of an adjacent unit to prevent longitudinal movement of the units when the carton is subjected to blows and flexure during shipment.

2. A frozen food package comprising a flexible carton and a plurality of individual frozen fish fillets closely packed within and substantially filling the interior of the carton, adjacent lateral side surfaces of said fish fillets being provided with preformed recesses of a depth not exceeding one-third of the total width of the fillet and with preformed projections of a width of from one-tenth to one-third of the width of the fillet, said fillets being packaged with the projection of one fillet interlocked with the recesses of an adjacent fillet.

References Cited in the file of this patent

UNITED STATES PATENTS

| | | |
|---|---|---|
| 1,773,080 | Birdseye | Aug. 12, 1930 |
| 2,114,530 | Gorton | Apr. 19, 1938 |

OTHER REFERENCES

"Quick Frozen Foods," August 1953, pp. 85 and 86.